(12) United States Patent
Lassmann et al.

(10) Patent No.: US 7,625,630 B2
(45) Date of Patent: Dec. 1, 2009

(54) COLOR AND/OR EFFECT COATING SYSTEM COMPRISING A COMBINATION EFFECT COAT

(75) Inventors: Walter Lassmann, Münster (DE); Klaus-Dieter Stegemann, Münster (DE); Horst Hintze-Brüning, Münster (DE); Joachim Woltering, Münster (DE); Wolfgang Reckordt, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/257,075

(22) PCT Filed: Mar. 15, 2001

(86) PCT No.: PCT/EP01/02912

§ 371 (c)(1),
(2), (4) Date: Oct. 29, 2002

(87) PCT Pub. No.: WO01/79360

PCT Pub. Date: Oct. 25, 2001

(65) Prior Publication Data

US 2004/0137165 A1    Jul. 15, 2004

(30) Foreign Application Priority Data

Apr. 14, 2000  (DE) ............................. 100 18 581

(51) Int. Cl.
*B32B 5/16*    (2006.01)
*B32B 27/32*   (2006.01)
*B05D 3/02*    (2006.01)

(52) U.S. Cl. .................. 428/220; 428/31; 428/323; 428/332; 428/908.8; 428/936

(58) Field of Classification Search ............. 428/31, 428/220, 323, 332, 908.8, 936
See application file for complete search history.

(56) References Cited

U.S. PATENT DOCUMENTS

| 5,379,947 | A | | 1/1995 | Williams et al. ............. 241/21 |
| 5,855,660 | A | * | 1/1999 | Bujard et al. ............... 106/418 |
| 5,981,696 | A | * | 11/1999 | Saatweber et al. .......... 427/195 |
| 6,352,586 | B1 | * | 3/2002 | Lassmann ................... 106/403 |

FOREIGN PATENT DOCUMENTS

| DE | 196 23 372 | 12/1997 |
| DE | 198 41 842 | 3/2000 |

OTHER PUBLICATIONS

English Language Abstract for DE 196 23 372.
English Language Abstract for DE 198 41 842.

* cited by examiner

*Primary Examiner*—Sheeba Ahmed
(74) *Attorney, Agent, or Firm*—Cantor Colburn LLP

(57) ABSTRACT

Disclosed is a combination effect coat that simultaneously provides at least one function selected from the group consisting of color, effect, or the combination thereof as well as at least one function selected from the group consisting of corrosion protection, adhesion promotion, absorption of mechanical energy, or the combination of two or more of the foregoing. The combination effect coat is produced by the application and curing of a pigmented powder slurry wherein the pigmented powder slurry is curable thermally, or curable thermally and with actinic radiation. The pigmented powder slurry consists of finely divided dimensionally stable constituents having an average particle size of from 0.8 to 40 µm, has a residual volatile solvent content of less than 1% by weight, and comprises a (meth)acrylate copolymer having an epoxide equivalent weight of 400 to 2500; and a color pigment, an effect pigment, or a combination thereof.

25 Claims, No Drawings

COLOR AND/OR EFFECT COATING SYSTEM COMPRISING A COMBINATION EFFECT COAT

This application is a National Phase Application of Patent Application PCT/EP01/02912 filed on 15. Mar. 2001.

FIELD OF INVENTION

The present invention relates to a novel color and/or effect coating system comprising a combination effect coat.

BACKGROUND ART

Color and/or effect coating systems on motor vehicle bodies, especially automobile bodies, nowadays consist preferably of a number of coats which are applied over one another and have different properties.

For example, an electrodeposition coat (EDC) as primer, a surfacer coat or antistonechip primer, a basecoat, and a clearcoat are applied in succession to a substrate. In this system, the EDC serves in particular to protect the metal panel against corrosion. In the art it is often also referred to as the primer. The surfacer coat serves to cover unevennesses in the substrate and because of its elasticity it imparts stonechip resistance. If appropriate, the surfacer coat may also act to reinforce the hiding power and to deepen the shade of the coating system. The basecoat controls the colors and/or the optical effects. The cleatcoat is used to intensify the optical effects and to protect the coating system against mechanical and chemical damage. Basecoat and clearcoat are often also referred to collectively as topcoat. For further details, reference is made to Römpp Lexikon Lacke und Druckfarben, George Thieme Verlag, Stuttgart, New York, 1998, pages 49 and 51, "Automotive Finishes".

A disadvantage is that the application of these color and/or effect coating systems frequently takes place in four separate steps, between each of which it is necessary to flash off the coating and may also be necessary to bake the coating, which is time-consuming, labor-intensive, and leads to increased energy and equipment costs. A further disadvantage is the environmental burden when using solventborne coating materials.

It is therefore fundamentally desirable to reduce the number of application steps and thus the number of coats. However, this entails other disadvantages, such as, for instance, inadequate stonechip resistance, coloring and/or an optical effect which fail to satisfy the requirements, or deficient chemical resistance and weathering stability of the coating systems in question.

An equally important objective is to reduce significantly, or even totally, the amount of organic solvents emitted in the coating operation. Indeed, appropriate coating materials, such as EDC, aqueous surfacers, aqueous basecoats or aqueous clearcoats, powder coating materials or powder slurry clearcoats, are available. To use them conjointly to produce a color and/or effect coating system requires, however, that their properties be matched to one another with great precision in order to avoid, for example, the breakdown of the uncured coats when employing wet-on-wet techniques and/or to prevent cracking, popping, and/or coat delamination. Furthermore, especially in the case of the aqueous basecoats, it is still always necessary to use a comparatively large amount of organic cosolvents in order to disperse the pigments stably and to ensure effective leveling of the applied coats.

The production of coats with different functions from aqueous dispersions of powder coating materials, also referred to by those in the art as powder slurries, is known.

For instance, Japanese Patent Application JP 53 109 540 A1 (Derwent Abstract 78800A/44) discloses a coating system comprising a basecoat which is from 10 to 45 µm thick and is prepared from a pigmented powder slurry, of which no further details are given, and a clearcoat which is from 30 to 70 µm thick. Whether the basecoat also functions as a surfacer or antistonechip primer is not specified.

German Laid-Open Specification DE 27 10 421 A1 discloses a powder slurry which comprises metal-effect pigments and is based on amine-neutralized acrylate copolymers and melamine resins or on polyesters and epoxy resins. The preparation of the pigmented powder slurries, however, requires that the water-soluble amine-neutralized starting materials be neutralized with hydrochloric acid. This may, however, permanently damage the metal-effect pigments. The known powder slurry gives smooth, glossy, metallic coatings. It is not said whether this slurry in addition may also take over the function of surfacer coats in coating systems.

Japanese Patent Application JP 02 014 776 A2 discloses a multicoat system, comprising basecoat and clearcoat, whose basecoat is prepared from a pigmented powder slurry based on hydroxyl-containing acrylate copolymers and blocked polyisocyanates. Here again, nothing is said as to whether the basecoat may also take over the function of a surfacer coat or antistonechip primer.

U.S. patent application Ser. No. 5,379,947 A1 discloses cosolvent-free pigmented and unpigmented powder slurries based, for example, on hydroxyl-containing acrylate copolymers and blocked polyisocyanates or glycidyl-containing acrylate copolymers and 1,12-dodecanedicarboxylic acid. The pigmented powder slurries can be used either to prepare primers, i.e., surfacer coats or antistonechip primers, or to prepare basecoats. Whether they are suitable for the production of coats able to fulfill both functions in a color and/or effect coating system is not stated It is an object of the present invention to provide a new color and/or effect coating system with a reduced number of coats which no longer has the disadvantages of the prior art but instead can be produced in fewer process steps than possible to date and without the use of cosolvents, the intention being that the good performance properties of the known coating systems in all their functions should be retained completely or even exceeded.

BRIEF SUMMARY OF THE INVENTION

Accordingly, we have found the novel color and/or effect coating system for a primed or unprimed substrate, which system comrprises a combination effect coat which can be prepared from a pigmented powder slurry.

In the text below, the novel color and/or effect coating system for a primed or unprimed substrate is referred to as "coating system of the invention".

Further subjects of the invention will emerge from the description.

In the light of the prior art it was surprising and unforeseeable for the skilled worker specifically that pigmented powder slurries would permit the production of the combination effect coats for use in accordance with the invention which possess the functions both of surfacer coats and antistonechip primers and of basecoats. This is all the more surprising since, firstly, the pigmented powder slurries are always proposed for the production of coats having essentially only one function, and, secondly, the customary and known surfacer coats and basecoats are produced from coating materials which are materially very different and have been very specifically adapted to their respective end use.

The combination effect coat for use in accordance with the invention is essential to the coating system of the invention. A combination effect coat for the purposes of the present invention is a coat which fulfills at least two functions in a color and/or effect coating system. These functions are, in particular, corrosion protection, adhesion promotion, the absorption of mechanical energy, and the provision of color and/or effect. In accordance with the invention, the combination effect coat serves in particular to absorb mechanical energy and to provide color and/or effect at the same time; it therefore fulfills the functions of a surfacer coat or antistonechip primer and of a basecoat. Furthermore, the combination effect coat preferably has a corrosion protection and/or adhesion promotion effect as well.

DETAIL DESCRIPTION OF THE INVENTION

Within a given coating system of the invention, the thickness of the combination effect coat is preferably constant. In some cases, however, it may be advisable to save on material by reducing the thickness of the coat in those regions of the substrate which are less subject to mechanical attack and/or are substantially or completely hidden.

Of course, the thickness of the combination effect coat may vary very greatly from one coating system of the invention to another. In this context, the optimum thickness for each specific case is guided in particular by the hiding power of the pigments used (cf. Römpp Lexikon Lacke und Druckfarben, Georg Thieme Verlag, Stuttgart, New York, 1998, page 124, "Hiding power"), by the ability to absorb or dissipate mechanical energy, by the ability to compensate for unevennesses in the substrate surface, and/or by the other constituents employed respectively in the powder slurry. The skilled worker will therefore be able to determine the optimum thickness on the basis of his or her general knowledge in the art, with the aid if required of simple preliminary rangefinding tests. The thickness of the combination effect layer is preferably from 10 to 100, more preferably from 15 to 90, with particular preference from 20 to 80, with very particular preference from 25 to 70, and, in particular, from 30 to 60 µm, based in each case on the coat.

In accordance with the invention, the combination effect coat can be prepared from a pigmented powder slurry.

The pigmented powder slurry for use in accordance with the invention comprises at least one finely divided dimensionally stable constituent, i.e., a powder coating material, as disperse phase and an aqueous medium as continuous phase.

The finely divided constituent or powder coating material can be solid and/or of high viscosity. For the purposes of the present invention, "of high viscosity" means that the particles behave essentially like solid particles under the customary and known conditions of the preparation, storage, and use of powder slurries. Preferably, the powder coating material is solid.

The individual particles of the finely divided constituent are, moreover, dimensionally stable For the purposes of the present invention, "dimensionally stable" means that, under the customary and known conditions of the storage and use of pigmented powder slurries, the particles agglomerate only slightly if at all and/or break down into smaller particles only slightly if at all, but rather essentially retain their original form even under the effect of shear forces.

In one embodiment, pigmented powder slurry will be pseudoplastic.

Preferably, the solids content of the pigmented powder slurry is from 10 to 80, more preferably from 15 to 75, with particular preference from 20 to 70, with very particular preference from 25 to 70, and, in particular, from 30 to 65% by weight, based in each case on the pigmented powder slurry.

Preferably, the average particle size of the finely divided dimensionally stable constituents of the pigmented powder slurry is from 0.8 to 40 µm, more preferably from 0.8 to 20 µm, and with particular preference from 2 to 6 µm. The average particle size is the 50% median determined by the laser diffraction method, i.e., 50% of the particles have a diameter≦the median and 50% of the particles have a diameter≧the median.

Pigmented powder slurries comprising average particle sizes of this kind exhibit better application properties and surprisingly, at the applied film thicknesses of >30 µm as currently practiced in the automotive industry for the OEM finishing of automobiles, exhibit a greatly reduced tendency toward popping and "mudcracking" than conventional combinations of surfaces, basecoat and clearcoat.

The particle size reaches its upper limit when the size of the particles means that they are no longer able to flow completely on baking, and the film leveling is adversely affected as a result. 40 µm is considered a reasonable upper limit, since above this particle size blockage of the rinsing ducts of the highly sensitive application apparatus may be expected.

The pigmented powder slurry is preferably free from organic solvents (cosolvents). For the purposes of the present invention this means that it has a residual volatile solvent content of <1% by weight, preferably <0.5% by weight, and with particular preference <0.2% by weight. In accordance with the invention, it is especially advantageous if the residual content is below the gas chromatography detection limit.

In a first embodiment which is preferred in accordance with the invention, the finely divided constituent of the powder slurry for use in accordance with the invention comprises at least one color and/or effect pigment; i.e., the totality of the pigments used are located within the dispersed powder coating particles.

In a second embodiment which is preferred in accordance with the invention, the pigmented powder slurry comprises at least one pigment-free finely divided constituent or powder coating material and at least one pulverulent color and/or effect pigment; i.e., all of the pigments are present in the form of a separate solid phase. For the particle size of these pigments, the remarks made above apply analogously.

In a third embodiment which is preferred in accordance with the invention, the pigmented powder slurry comprises at least one dispersed powder coating material, which contains some of the pigments used, while the remainder of the pigments are present in the form of a separate solid phase. In this case, the fraction present in the powder coating particles may comprise the majority, i.e., more than 50%, of the pigments used. However, it is also possible for less than 50% to be located within the powder coating particles. As far as the particle sizes are concerned, the remarks made above apply analogously here as well.

The particular variant of the pigmented powder slurry for use in accordance with the invention that is given preference depends in particular on the nature of the pigments and/or on the process by which the pigmented powder slurry used in each case is prepared. In the majority of cases, the first preferred embodiment offers particular advantages, and so is particularly preferred in accordance with the invention.

The pigments may comprise organic or inorganic compounds Because of this large number of suitable pigments, therefore, the powder slurry for use in accordance with the invention ensures universality in its breadth of use and enables the realization of a large number of color shades and optical effects.

Effect pigments used may be metal flake pigments such as commercial aluminum bronzes, aluminum bronzes chromated in accordance with DE-A-36 36 183, commercial stainless steel bronzes, and metal and nonmetal effect pigments, such as pearlescent pigments and interference pigments, for example. For further details reference is made to Römpp Lexikon Lacke und Druckfarben, George Thiemie Verlag, 1998, page 176, "Effect Pigments" and pages 380 and 381 "Metal oxide-mica Pigments" to "Metal Pigments".

Examples of suitable inorganic color pigments are titanium dioxide, iron oxides, and carbon black. Examples of suitable organic color pigments are thioindigo pigments, indanthrene blue, Irgalith blue, Heliogen blue, Irgazine blue, Palomar blue, Cromophthal red, Hostaperm pink, Irgazine orange, Sicotrans yellow, Sicotan yellow, Hostaperm yellow, Paliotan yellow, and Heliogen green. For further details reference is made to Römpp Lexikon Lacke und Drucktarben, George Thieme Verlag, 1998, pages 180 and 181 "Iron blue pigments" to "Iron oxide black", pages 451 to 453, "Pigments" to "Pigment volume concentration", page 563, "Thioindigo pigments" and page 567, "Titanium dioxide pigments".

The powder slurry for use in accordance with the invention may further comprise organic and inorganic fillers, which like the pigments may be present within and outside the dispersed powder coating particles; the comments made with regard to the pigments apply analogously here.

Examples of suitable organic and inorganic fillers are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers, polyacrylonitrile powders, polyamide powders, or wood flour. For further details reference is made to Römpp Lexikon Lacke and Druckfarben, George Thieme Verlag, 1998, pages 250 ff., "Fillers". Further examples of suitable fillers are disclosed in German Patent Application DE 196 06 706 A1, column 8, lines 30 to 64. They are preferably used in the amounts specified there.

The pigments and fillers may also be present in an ultrafine, nonhiding form, thereby giving transparent combination effect coats for use in accordance with the invention.

The proportion of the pigments, including the fillers, in the pigmented powder slurries for use in accordance with the invention may vary very widely and is guided by the requirements of the specific case, in particular by the optical effect to be established and/or by the hiding power of the particular pigments used. Preferably, the pigment content is from 0.5 to 80, more preferably from 0.8 to 75, with particular preference from 1.0 to 70, with very particular preference from 1.2 to 65, and, in particular from 1.3 to 60% by weight, based in each case on the solids content of the pigmented powder slurry.

In addition to the pigments described above, the powder slurry for use in accordance with the invention may comprise organic dyes in molecularly disperse distribution. Alternatively, it contains dyes in molecularly disperse distribution instead of the pigments.

These dyes in molecularly disperse distribution may be present either in the dispersed powder coating particles or in the continuous phase of the powder slurry for use in accordance with the invention.

Alternatively, they may be present in the disperse powder coating particles and in the continuous phase. In this case, the fraction present in the powder coating particles may comprise the majority, i.e., more than 50% of the organic dyes used. Alternatively, less than 50% may be present in the powder coating particles The distribution of the organic dyes between the phases may correspond to the thermodynamic equilibrium that results from the solubility of the organic dyes in the phases, The distribution may, however, also be far removed from the thermodynamic equilibrium.

Suitable organic dyes are all those which are soluble in the sense described above in the powder slurry for use in accordance with the invention. Lightfast organic dyes are highly suitable. Particularly suitable lightfast organic dyes are those having little or no tendency to migrate from the combination effect coat for use in accordance with the invention. The migration tendency can be estimated by the skilled worker on the basis of his or her general knowledge in the art and/or determined with the aid of simple preliminary rangefinding tests: for example, in tinting experiments.

The amount of organic dyes in molecularly disperse distribution in the powder slurry for use in accordance with the invention may vary extremely widely and is guided primarily by the color and by the shade to be established and also by the amount of any pigments and/or fillers present.

In accordance with the remarks made above, the finely divided dimensionally stable constituent of the pigmented powder slurry essentially comprises a powder coating material which is pigmented, not pigmented, pigmented and dyed, or not pigmented and dyed.

Said powder coating material may be curable physically, thermally, or thermally and with actinic radiation. In special cases, powder coating materials curable only with actinic radiation may also be entirely suitable. The thermally curable powder coating materials, in turn, may be self-crosslinking or externally crosslinking.

For the purposes of the present invention, "physical curing" is the curing of a layer of a coating material by filming as a result of loss of solvent from the coating material, linking within the coating taking place via the formation of loops of the polymer molecules of the binders (regarding the term of. Römpp Lexikon Lacke und Druckfarben, George Thieme Verlag, Stuttgart, New York, 1998, "Binders", pages 73 and 74). Alternatively, filming takes place by way of the coalescence of binder particles (cf. Pömpp Lexikon Lacke und Druckfarben, George Thieme Verlag, Stuttgart, New York, 1998, "Curing", pages 274 and 275). Normally, no crosslinking agents are required for this purpose. If desired, physical curing may be assisted by atmospheric oxygen, by heat, or by exposure to actinic radiation.

For the purposes of the present invention, "self-crosslinking" denotes the property of a binder to enter into crosslinking reactions with itself. A prerequisite for this is that the binders already contain both types of complementary reactive functional groups that are necessary for crosslinking. Externally crosslinking, on the other hand, is the term used to refer to coating materials, adhesives and sealing compounds in which one type of the complementary reactive functional groups is present in the binder and the other type in a hardener, curing agent or crosslinking agent. For further details reference is made to Römpp Lexikon Lacke und Druckfarben, George Thieme Verlag, Stuttgart, New York, 1998, "Curing", pages 274 to 276, especially page 275, bottom.

For the purposes of the present invention, actinic radiation is electromagnetic radiation, such as near infrared (NIR), visible light, UV radiation or X-rays, especially UV radiation, and corpuscular radiation such as electron beams If thermal and actinic light curing are used together for a powder coating material, the terms used include "dual cure" and "dual-cure powder coating material" or "dual-cure powder slurry".

The powder coating material comprises as essential constituent at least one binder.

The binders are oligomeric and polymeric resins. By oligomers ate meant resins containing at least 2 to 15 monomer units in their molecule. For the purposes of the present invention, polymers are resins containing at least 10 repeating monomer units in their molecule. For further details of these terms reference is made to Römpp Lexikon Lacke und Druckfarben, George Thieme Verlag, Stuttgart, New York, 1998, "Oligomers" page 425.

In accordance with the invention it is of advantage if the minimum film-forming temperature of the binders is at least 0° C., preferably at least 10, with particular preference at least 15, with very particular preference at least 20, and, in particular, at least 25° C. The minimum film-forming temperature can be determined by drawing down the aqueous dispersion of the binder onto a glass plate using a coating bar and heating it in a gradient oven. The temperature at which the pulverulent layer films is referred to as the minimum film-forming temperature. For further details reference is made to Rompp Lexikon Lacke und Druckfarben, George Thieme Verlag, Stuttgart, New York, 1998 "Minimum film-forming temperature", page 391.

Examples of suitable binders are random, alternating and/or block addition (co)polymers of linear and/or branched and/or comblike construction of ethylenically unsaturated monomers, or polyaddition resins and/or polycondensation resins. For further details of these terms reference is made to Rompp Lexikon Lacke und Druckfarben, George Thieme Verlag, Stuttgart, New York, 1998, page 457, "Polyaddition" and "Polyaddition resins (polyadducts)", and pages 463 and 464, "Folycondensates", "Polycondensation" and "Polycondensation resins", and also pages 73 and 74, "Binders".

Examples of suitable addition (co)polymers are (meth)acrylate (co)polymers or partially hydrolyzed polyvinyl esters, especially (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyester-polyurethanes.

Of these binders, the (meth)acrylate (co)polymers have particular advantages and are therefore used with particular preference.

The self-crosslinking binders of the thermally curable powder coating materials and of the dual-cure powder coating materials comprise reactive functional groups which are able to enter into crosslinking reactions with groups of their type or with complementary reactive functional groups. The externally crosslinking binders comprise reactive functional groups which are able to enter into crosslinking reactions with complementary reactive functional groups present in crosslinking agents Examples of suitable complementary reactive functional groups for use in accordance with the invention are summarized in the following overview. In the overview, the variable R is an acyclic or cyclic aliphatic, an aromatic, and/or an aromatic-aliphatic (araliphatic) radical; the variables R' and R" are identical or different aliphatic radicals or are linked to one another to form an aliphatic or hateroaliphatic ring.

| Overview: Examples of complementary functional groups | | |
|---|---|---|
| Binder | and or | crosslinking agent |
| Crosslinking agent | and | binder |
| —SN | | —C(O)—OH |
| —NH$_2$ | | —C(O)—O—C(O)— |
| —OH | | —NCO |
| —O—(CO)—NH—(CO)—NH$_2$ | | —NH—C(O)—OR |
| —O—(CO)—NH$_2$ | | —CH$_2$—OH |
| >NH | | —CH$_2$—O—R |
| | | —NH—CH$_2$—O—R |
| | | —NH—CH$_2$—OH |
| | | —N(—CH$_2$—O—R)$_2$ |
| | | —NH—C(O)—CH(—C(O)OR)$_2$ |
| | | —NH—C(O)—CH(—C(O)OR)(—C(O)—R) |
| | | —NH—C(O)—NR'R" |
| | | >Si(OR)$_2$ |
| | | $\overset{O}{\overset{\diagup \diagdown}{-CH-CH_2}}$ |
| | | $\overset{O}{\underset{O \quad O}{\overset{\|}{C}}}$ |
| | | $-CH-CH_2$ |
| —C(O)—OH | | $\overset{O}{\overset{\diagup \diagdown}{-CH-CH_2}}$ |
| | | —C(O)—N(CH$_2$—CH$_2$—OH)$_2$ |

The selection of the complementary groups in each case is guided firstly by the fact that during the preparation, storage, application, and melting of the pigmented powder slurries for use in accordance with the invention they should not enter into any unwanted reactions, in particular no premature crosslinking, and/or, if appropriate, should not disrupt or inhibit curing with actinic radiation, and secondly by the temperature range within which crosslinking is to take place.

In the case of the pigmented powder slurries for use in accordance with the invention, it is preferred to employ crosslinking temperatures of from 60 to 180° C. Use is therefore made preferably of thio, hydroxyl, N-methylolamino, N-alkoxymethylamino, imino, carbamate, allophanate and/or carboxyl groups, preferably hydroxyl or carboxyl groups, on the one hand, and preferably crosslinking agents containing anhydride, carboxyl, epoxy, blocked isocyanate, urethane, methylol, methylol ether, siloxane, carbonate, amino, hydroxyl and/or beta-hydroxyalkyl-amide groups, preferably epoxy, beta-hycdroxyalkylamide, blocked isocyanate, urethane or alkoxymethylamino groups, on the other.

In the case of self-crosslinking pigmented powder slurries, the binders contain in particular methylol, methylol ether, and/or N-alkoxymethylamino groups.

Complementary reactive functional groups especially suitable for use in the pigmented powder slurries for use in accordance with the invention are
- carboxyl groups on the one hand and epoxide groups and/or beta-hydroxyalkylamide groups on the other, and
- hydroxyl groups on the one hand and blocked isocyanate, urethane or alkoxymethylamino groups on the other.

The functionality of the binders in respect of the reactive functional groups described above may vary very widely and depends in particular on the desired crosslinking density and/or on the functionality of the crosslinking agents employed in each case. In the case of carboxyl-containing binders, for example, the acid number is preferably from 10 to 100, more preferably from 15 to 80, with particular preference from 20 to 75, with very particular preference from 25 to 70, and, in particular, from 30 to 65 mg KOH/g. Alternatively, in the case of hydroxyl-containing binders the OH number is preferably from 15 to 300, more preferably from 20 to 250, with particular preference from 25 to 200, with very particular preference from 30 to 150, and, in particular from 35 to 120 mg KOH/g. Alternatively, in the case of binders containing epoxide groups, the epoxide equivalent weight is preferably from 400 to 2500, more preferably from 420 to 2200, with particular preference from 430 to 2100, with very particular preference from 440 to 2000, and, in particular, from 440 to 1900.

The complementary functional groups described above can be incorporated into the binders in accordance with the customary and known methods of polymer chemistry. This can be done, for example, by incorporating monomers which carry the corresponding reactive functional groups, and/or with the aid of polymer-analogous reactions.

Examples of suitable olefinically unsaturated monomers containing reactive functional groups are
- a1) Monomers which carry at least one hydroxyl, amino, alkoxymethylamino, carbamate, allophanate or imino group per molecule, such as
  - hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxylbutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indeniedimethanol or methylpropanediol monoacrylate, monomethacrylate, monoethacrylate, monocrotonate, monomaleate, monofumarate or monoitaconate; reaction products of cyclic esters, such as epsilon-caprolactone and these hydroxyalkyl or hydroxycycloalkyl esters;
  - olefinically unsaturated alcohols such as allyl alcohol;
  - polyols such as trimethylolpropane monoallyl or diallyl ether or pentaerythritol monoallyl, diallyl or triallyl ether;
  - reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched monocarboxylic acid having 5 to 18 carbon atoms per molecule, especially a Versatic® acid;
  - aminoethyl acrylate, aminoethyl methacrylate, allylamine or N-methyliminoethyl acrylate;
  - N,N-di(methoxymethyl)aminoethyl acrylate or methacrylate or N,N-di(butoxymethyl)aminopropyl acrylate or methacrylate;
  - (meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth) acrylamide;
  - acryloyloxy- or methacryloyloxyethyl-, -propyl- or -butylcarbamate or -allophanate; further examples of suitable monomers containing carbamate groups are described in the patents U.S. Pat. No. 3,479,328, U.S. Pat. No. 3,674,838, U.S. Pat. No. 4,126,747, U.S. Pat. No. 4,279,833 or U.S. Pat. No. 4,340,497;
- a2) Monomers which carry at least one acid group per molecule, such as
  - acrylic acid, methacrylic acid, ethacrylic acid, crotonic acid, maleic acid, fumaric acid or itaconic acid;
  - olefinically unsaturated sulfonic or phosphonic acids or their partial esters;
  - mono(meth)acryloyloxyethyl maleate, succinate or phthalate; or
  - vinylbenzoic acid (all isomers), alpha-methylvinylbenzoic acid (all isomers) or vinylbenzenesulfonic acid (all isomers);
- a3) Monomers containing epoxide groups, such as the glycidyl ester of acrylic acid, methacrylic acid, ethacrylic acid, crotonic acid, maleic acid, fumaric acid or itaconic acid, or allyl glycidyl ether.

They are preferably used to prepare the (meth)acrylate copolymers that are preferred in accordance with the invention, especially the ones containing glycidyl groups.

More highly functional monomers of the type described above are generally used in minor amounts. For the purposes of the present invention, minor amounts of higher-functional monomers are those amounts which do not lead to crosslinking or yelling of the addition copolymers, in particular of the (meth)acrylate copolymers, unless the specific desire is to prepare crosslinked polymeric microparticles.

Examples of suitable monomer units for introducing reactive functional groups into polyesters or polyester-polyurethanes are 2,2-dimethylolethyl- or -propylamine blocked with a ketone, the resulting ketoxime group being hydrolyzed again following incorporation, or compounds containing two hydroxyl groups or two primary and/or secondary amino groups and also at least one acid group, in particular at least one carboxyl group and/or at least one sulfonic acid group, such as dihydroxypropionic acid, dihydroxy-succinic acid, dihydroxybenzoic acid, 2,2-dimethylolacetic acid, 2,2-dimethylolpropionic acid, 2,2-dimethylolbutyric acid, 2,2-dimethylolpentanoic acid, $\alpha,\delta$-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this kind are known from the patents U.S. Pat. No. 4,758,632 A1, U.S. Pat. No. 4,301,257 A1 or U.S. Pat. No. 2,979,514 A1.

The binders of the pigmented dual-cure powder slurries for use in accordance with the invention further comprise on average at least one, preferably at least two, group(s) having at least one bond per molecule that can be activated with actinic radiation.

For the purposes of the present invention, a bond that can be activated with actinic radiation is a bond which on exposure to actinic radiation becomes reactive and, with other activated bonds of its kind, enters into addition polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as double bonds.

Accordingly, the group which is preferred in accordance with the invention comprises one double bond or two, three or four double bonds. If more than one double bond is used, the double bonds can be conjugated. In accordance with the invention, however, it is of advantage if the double bonds are present in isolation, in particular each being present terminally, in the group in question. It is of particular advantage in accordance with the invention to use two double bonds or, in particular, one double bond.

The dual-cure binder contains on average at least one of the above-described groups that can be activated with actinic radiation. This means that the functionality of the binder in this respect is integral, i.e., for example, is two, three, four, five or more, or nonintegral, i.e., for example, is from 2.1 to 10.5 or more. The functionality chosen depends on the requirements imposed on the respective pigmented dual-cure powder slurry.

If more than one group that can be activated with actinic radiation is used on average per molecule, the groups are structurally different from one another or of the same structure.

If they are structurally different from one another, this means, in the context of the present invention, that use is made of two, three, four or more, but especially two, groups that can be activated by actinic radiation, these groups deriving from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl, norbornenyl, isoprenyl, isopropenyl, allyl or butenyl ether groups; or dicyclopentadienyl, norbornenyl, isoprenyl, isopropenyl, allyl or butenyl ester groups, but especially acrylate groups.

Preferably, the groups are attached to the respective parent structures of the binders via urethane, urea, allophanate, ester, ether and/or amide groups, but in particular via ester groups. Normally, this occurs as a result of customary and known polymer-analogous reactions such as, for instance, the reaction of pendant glycidyl groups with the olefinically unsaturated monomers described above that contain an acid group, of pendant hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from the company CYTEC), or of isocyanate groups with the above-described hydroxyl-containing monomers.

Alternatively, in the dual-cure powder coating naterials, it is possible to employ mixtures of purely thermally curable binders and binders that are curable purely with actinic radiation.

The material composition of the binders does not basically have any special features; rather, suitable binders include all the binders envisaged for use in powder clearcoat slurries curable thermally and/or with actinic radiation that are described in U.S. Pat. No. 4,268,542 A1 or U.S. Pat. No. 5,379,947 A1 and in patent applications DE 27 10 421 A1, DE 195 40 977 Al, DE 195 18 392 A1, DE 196 17 086 A1, DE 196 13 547 A1, DE 196 18 657 A1, DE 196 52 813 A1, DE 196 17 086 A1, DE 198 14 471 Al, DE 198 41 842 A1 or DE 198 41 408 A1, in German Patent Applications DE 199 08 018.6 or DE 199 08 013.5, unpublished at the priority date of the present specification, or in European Patent EP 0 652 264 A1;

all the banders envisaged for use in dual-cure clearcoats that are described in patent applications DE 198 35 296 A1, DE 197 36 083 A1 or DE 198 41 842 A1; or all the binders envisaged for use in thermally curable powder clearcoats and described in German Patent Application DE 42 22 194 A1, in the product information bulletin from BASF Lacke+Farben AG, "Pulverlacke", 1990, or in the BASF Coatings AG brochure "Pulverlacke, Pulverlacke fur industrielle Anwendungen", January 2000.

Suitable additional binders for the dual-cure powder coating materials are the binders envisaged for use in UV-curable clearcoats and powder clearcoats and described in European Patent Applications EP 0 928 800 A1, 0 636 669 A1, 0 410 242 A1, 0 783 534 A1, 0 650 978 A1, 0 650 979 A1, 0 650 985 A1, 0 540 884 A1, 0 568 967 A1, 0 054 505 A1 or 0 002 866 A1, in German Patent Applications DE 197 09 467 A1, 42 03 278 A1, 33 16 593 A1, 38 36 370 A1, 24 36 186 A1 or 20 03 579 B1, in the international patent applications WO 97/46549 or 99/14254, or in U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1 or 3,974,303 A1.

The preparation of the binders also has no special features as to its method, but takes place with the aid of the customary and known methods of polymer chemistry, as described in detail, for example, in the patent documents recited above.

Further examples of suitable preparation processes for (meth)acrylate copolymers are described in European Patent Application EP 0 767 185 A1, in German Patents DE 22 14 650 B1 or DE 27 49 576 B1, and in U.S. Pat. No. 4,091,048 A1, U.S. Pat. No. 3,781,379 A1, U.S. Pat. No. 5,480,493 A1, U.S. Pat. No. 5,475,073 A1 or U.S. 5,534,598 A1, or in the standard work Houben-Weyl, Methoden der organischen Chemie, 4th Edition, Volume 14/1, pages 24 to 255, 1961, Suitable reactors for the copolymerization are the customary and known stirred vessels, cascades of stirred vessels, tube reactors, loop reactors or Taylor reactors, as described, for example, in the patents and patent applications DE 1 071 241 B1, EP 0 498 583 A1 or DE 198 28 742 A1 or in the article by K. Kataoka in Chemical Engineering Science, Volume 50, No. 9, 1995, pages 1409 to 1416.

The preparation of polyesters and alkyd resins is also described, for example, in the standard work Ullmanns Encyklopädie der technischen Chemie, 3rd Edition, Volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

The preparation of polyurethanes and/or acrylated polyurethanes is also described, for example, in the patent applications EP 0 708 788 A1, DE 44 01 544 A1 or DE 195 34 361 A1.

Of all of these binders, the (meth)acrylate copolymers containing epoxide groups, having an epoxide equivalent weight of preferably from 400 to 2500, more preferably from 420 to 2200, with particular preference from 430 to 2100, with very particular preference from 440 to 2000, and, in particular, from 440 to 1900, a number-average molecular weight (determined by gel permeation chromatography using a polystyrene standard) of preferably from 2000 to 20,000 and in particular from 3000 to 10,000, and a glass transition temperature ($T_g$) of preferably from 30 to 80, more preferably from 40 to 70 and in particular from 40 to 60° C. (measured by means of differential scanning calorimetry (DSC), as suitable in particular for use in thermally curable powder clearcoat slurries (see above) and as described, furthermore, in the patents and patent applications EP 0 299 420 A1, DE 22 14 650 B1, DE 27 49 576 B1, U.S. Pat. No. 4,091,048 A1 or U.S. Pat. No. 3,781,379 A1, are particularly advantageous and are used with particular preference in accordance with the invention.

The binder content of the powder coating materials may vary very widely and depends in particular on whether they are physically or thermally self-crosslinking. In these two cases, it can be preferably from 20 to 99.5, more preferably from 25 to 99.2, with particular preference from 30 to 99, with very particular preference from 35 to 98.8, and, in particular, from 40 to 98.7% by weight, based on the solids content of the pigmented powder slurry. In the other cases, the binder content is preferably from 10 to 80, more preferably from 15 to 75, with particular preference from 20 to 70, with very particular preference from 25 to 65, and, in particular, from 30 to 60% by weight, based on the solids content of the pigmented powder slurry.

The externally crosslinking power coating materials curable thermally, or thermally and with actinic radiation, comprise at least one crosslinking agent which comprises. the reactive functional groups complementary to the reactive functional groups of the binders. Consequently, the skilled worker is easily able to select the crosslinking agents suitable for a given powder coating material.

Examples of suitable crosslinking agents are

Amino resins, as described for example in Römpp Lexikon Lacke und Druckfarben, George Thieme Verlag, 1998, page 29, "Amino resins", in the textbook "Lackadditive" by Johan Bieleman, Wiley-VCH, Weinheim, N.Y., 1998, pages 242 ff., in the book "Paints, Coatings and Solvents", second completely revised edition, Eds. D. Stoye and W. Freitag, Wiley-VCH, Weinheim, N.Y., 1998, pages 80 ff., in patents U.S. Pat. No. 4,710,542 A1 or EP 0 245 700 A1, and in the article by B. Singh and coworkers "Carbamylmethylated Melamines, Novel Crosslinkers for the Coatings Industry" in Advanced Organic Coatings Science and Technology Series, 1991, Volume 13, pages 193 to 207;

carboxyl-containing compounds or resins, as described for example in the patent DE 196 52 813 A1 or 198 41 408 A1, especially 1,12-dodecanedicarboxylic acid;

epoxy-containing compounds or resins, as described for example in patents EP 0 299 420 A1, DE 22 14 650 B1, DE 27 49 576 B1, U.S. Pat. No. 4,091,048 A1 or U.S. Pat. No. 3,781,379 A1;

blocked polyisocyanates, as described for example in the patents U.S. Pat. No. 4,444,954 A1, DE 196 17 086 A1, DE 196 31 269 A1, EP 0 004 571 A1 or EP 0 582 051 A1;

beta-hydroxyalkylamides such as N,N,N', N'-tetrakis(2-hydroxyethyl)adipamide or N,N,N', N'-tetrakis(2-hydroxypropyl)adipamide; and/or tris(alkoxycarbonylamino)triazines, as described in patents U.S. Pat. No. 4,939,213 A1, U.S. Pat. No. 5,084,541 A1, U.S. Pat. No. 5,288,865 A1 or EP 0 604 922 A1.

The crosslinking agent content of the powder coating materials may likewise vary very widely and depends on the requirements of the individual case, in particular on the number of reactive functional groups present. It is preferably from I to 40, more preferably from 2 to 35, with particular preference from 3 to 30, with very particular preference form 4 to 27, and, in particular, from 5 to 25% by weight, based on the solids content of the pigmented powder slurry In addition to the above-described pigments and binders, the pigmented powder slurry for use in accordance with the invention may further comprise, if desired, at least one additive. Depending on its physicochemical properties and/or its function, said additive may be present essentially in the dispersed powder coating particles or essentially in the continuous phase.

Examples of suitable additives are thermally curable reactive diluents such as positionally isomeric diethyloctanediols or hydroxyl-containing hyperbranched compounds or dendrimers;

reactive diluents curable with actinic radiation, such as those described in Römpp Lexikon Lacke und Druckfarben, George Thieme Verlag, Stuttgart, New York, 1998 on page 491 under the headword "Reactive diluents";

crosslinking catalysts such as dibutyltin dilaurate, lithium decanoate or zinc octoate, amine-blocked organic sulfonic acids, quaternary ammonium compounds, amines, imidazole and imidazole derivatives such as 2-styrylimidazole, 1-benzyl-2-methylimidazole, 2-methylimidazole and 2-butylimidazole, as described in Belgian Patent No. 756,693, or phosphonium catalysts such as ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutyl-phosphonium acetate-acetic acid complex, as are described, for example, in U.S. Pat. No. 3,477,990 A1 or U.S. Pat. No. 3,341,580 A1;

thermally labile free-radical initiators such as organic peroxides, organic azo compounds or C-C-cleaving initiators such as dialkyl peroxides, peroxocarboxylic acids, peroxodicarbonates, peroxide esters, hydroperoxides, ketone peroxides, azodinitriles or benzpinacol silyl ether;

photoinitiators, as described in Römpp Chemie Lexikon, 9th expanded and revised edition, Georg Thieme Verlag, Stuttgart, Vol. 4, 1991, or in Römpp Lexikon Lacke und Druckfarben, Georg Thieme Verlag, Stuttgart, 1998, pages 444 to 446;

antioxidants such as hydrazines and phosphorus comnpounds;

UV absorbers such as triazines and benzotriphenol;

light stabilizers such as HALS compounds, benzotriazoles or oxalanilides;

leveling agents;

free-radical scavengers and polymerization inhibitors such as organic phosphites or 2, 6-di-tert-butylphenol derivatives;

slip additives;

defoamers;

emulsifiers, especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes, as described, for example, in detail in patent application DE 198 35 296 A1, especially in conjunction with the polyurethane-based associative thickeners described below;

adhesion promoters such as tricyclodecanedi-methanol;

film-forming auxiliaries such as cellulose derivatives;

flame retardants;

deaerating agents such as diazadicycloundecane or benzoin;

water retention agents;

free-flow aids;

rheology control additives (thickeners), such as those known from patents WO 94/22968, EP-A-0 276 501, EP-A-0 249 201 or WO 97/12945; crosslinked polymeric microparticles, such as those disclosed, for example, in EP-A-0 008 127; inorganic sheet silicates such as aluminum-magnesium silicates, sodium-magnesium and sodium-magnesium-fluorine-lithium sheet silicates or the montmorillonite type; silicas such as Aerosils; or synthetic polymers having ionic and/or associative groups, such au polyvinyl alcohol, poly (meth)-acrylamide, poly(meth)acrylic acid, polyvinylpyrrolidone, styrene-maleic anhydride copolymers or ethylene-maleic anhydride copolymers and their derivatives or polyacrylates; or polyurethane-based associative thickeners, as described in Römpp Lexikon Lacke und Druckfarben, Georg Thieme Verlag, Stuttgart, N.Y., 1998, "Thickeners", pages 599 to 600, and in the textbook "Lackadditive" by Johan Bieleman, Wiley-VCH, Weinheim, N.Y., 1998, pages 51 to 59 and 65; especially combinations of ionic and nonionic thickeners, as described in patent application DE 198 41 842 for establishing a pseudoplastic behavior, or the combination of polyurethane-based associative thickeners and polyurethane-based wetting agents, as is described in detail in German Patent Application DE 198 35 296 A1, Further examples of suitable additives are described in the textbook "Lackadditive" by Johan Bieleman, Wiley-VCH, Weinheim, N.Y., 1998. They are employed in the customary and known amounts.

The preparation of the pigmented powder slurries for use in accordance with the invention, comprising the constituents described above, likewise has no special features, but instead takes place essentially as described in detail in patent applications DE 195 40 977 A1, DE 195 18 392 A1, DE 196 17 086 A1, DE-A-196 13 547, DE 196 18 657 A1, DE 196 52 813 A1, DE 196 17 086 A1, DE-A-198 14 471 A1, DE; 198 41 842 A1 or DE 198 41 408 A1, except that in the context of the present invention pigments are processed as well.

In a first preferred variant of the preparation, the starting material is a pigmented powder coating material prepared as in the product information bulletin from BASF Lacke+Farben AG, "Pulverlacke", 1990, or in the BASF Coatings AG brochure "Pulverlacke, Pulverlacke für industrielle Anwendungen", January 2000, by homogenization and dispersion, using for example an extruder or screw compounder, and milling. Following preparation of the powder coating materials, they are prepared for dispersing by further milling and, if appropriate, by classifying and sieving.

Subsequently, the aqueous powder coating dispersion can be prepared from the powder coating material by wet milling or by stirred incorporation of dry-milled powder coating material. Particular preference is given to wet milling.

In another preferred variant, the constituents described above are emulsified in an organic solvent to give an emulsion of the oil-in-water type, after which the organic solvent is removed; as a result of this, the emulsified droplets solidify to give the pigmented powder slurry for use in accordance with the invention. If desired, it may further be subjected to wet milling in order to improve its filterability.

In a third preferred variant, a liquid melt of the constituents described above together with the unmelted pigments is introduced into an emulsifying apparatus, preferably with the addition of water and stabilizers, and the emulsion obtained is cooled and filtered, giving the pigmented powder slurry for use in accordance with the invention. In order to achieve a high quality of mixing, it is essential to carry out mixing in the melt without solvent. Accordingly, the polymeric constituents are fed into the dispersing apparatus in the form of viscous resin melts.

To produce the combination effect coat that is essential to the invention, the above-described pigmented powder slurries are applied to substrates by the process of the invention.

Although the combination effect coat is also suitable for use outside of the coating of motor vehicle bodies, its principal industrial end use lies within said sector since it is here that its special advantages are manifested quite obviously. The substrates are therefore motor vehicle bodies, especially automobile bodies, and also parts thereof, such as doors, engine hoods, wings, trunk lid spoilers, sills or wind deflectors.

These bodies and parts consist in particular of steel or aluminum. The metal surfaces may in this case carry primers. In the case of aluminum, for example, there may be an oxide layer produced by anodic oxidation (Eloxal® process). In the case of steel, there is normally a thermally cured cathodic electrodeposition coating. However, it is also possible to use a cathodic electrodeposition coat which has not been thermally cured but is merely dried or partially cured.

The electrodeposition coat or coating is then overcoated with the pigmented powder slurry for use in accordance with the invention, which is either cured on its own or together with the electrodeposition coat (wet-on-wet process).

Examples of suitable cathodic electrodeposition coating materials and also, where appropriate, of wet-on-wet processes are described in Japanese Patent Application 1975-142501 (Japanese Laid-Open Specification JP 52-065534 A2, Chemical Abstracts No. 87: 137427) or in the patents U.S. Pat. No. 4,375,498 A1, U.S. Pat. No. 4,537,926 A1, U.S. Pat. No. 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

The pigmented powder slurries can be applied using the methods known from liquid coating technology. In particular, they can be applied by means of spraying processes. Preferably, they are applied by electrostatic painting of the exterior body parts followed by pneumatic spraying (compressed-air spraying) of the interior body parts.

The electrostatic painting can take place by means of an electrostatic spraying gap, an electro-static spraying bell, or an electrostatic spraying disk.

Furthermore, the electrostatic painting may take place by means of electrostatically assisted mechanical atomization. Preferably, this is carried out with the aid of electrostatic high-speed rotary disks or high-speed rotary bells.

The pneumatic spraying or compressed-air painting, as well, has no special features as to its method, but can be carried out by hand or using customary and known automatic painting equipment or paint robots.

For further details, reference is made here to Römpp Lexikon Lacke und Druckfarben, Georg Thieme Verlag, Stuttgart, New York, 1998, page 186: "Electrostatic coating", page 187: "Electrostatic spray guns", "Electrostatic Spraying", and page 165: "Compressed-air spraying".

Preferably, application is carried out under illumination with visible light having a wavelength of more than 550 µm or in the absence of light if the pigmented powder slurries are curable thermally and with actinic radiation. By this means, material alteration or damage to the coating material to be used in accordance with the invention and to the overspray is avoided.

In general, the pigmented powder slurries are applied in a wet film thickness such that curing thereof results in combination effect coats having the above-described coat thicknesses advantageous and necessary for their functions.

Of course, these application processes can also be employed for the application of additional coats, preferably clearcoats, provided the coating material concerned is not a powder coating material, especially a powder clearcoat, which is preferably processed in accordance with the processes described in the product information bulletin from BASF Lacke+Farben AG, "Pulverlacke", 1990 or the BASF Coatings AG brochure "Pulverlacke, Pulverlacke für industrielle Anwendungen", January 2000.

Following its application, the coat of the pigmented powder slurry is physically cured, giving the combination effect coat. In this context, it is not necessary per se to take any special measures, although physical curing may be assisted by atmospheric oxygen, by heat, or by exposure to actinic radiation.

Following its application, the coat of the thermally curable pigmented powder slurry is thermally cured. Full curing may be carried out after a certain resting time or flash-off time. It may last for from 30 seconds to 2 hours, preferably from 1 minute to 1 hour, and in particular from 1 minute to 45 minutes. The resting time is used, for example, for leveling and degassing of the coats and for the evaporation of volatile constituents such as any solvents and/or water that may still be present. Flashing off can be accelerated by an elevated temperature though still below that for curing, and/or by reduced atmospheric humidity.

The thermal curing has no special features as to its method, but instead takes place in accordance with the customary and known methods, such as heating in a circulating-air oven or irradiation with IR and/or NIR lamps. As in the case of curing with actinic radiation, the thermal curing may also take place in stages. Advantageously, thermal curing takes place at temperatures from 100 to 180° C.

Following its application, the coat of the pigmented dual-cure powder slurry is cured thermally and with actinic radiation.

In the case of curing with actinic radiation, it is preferred to employ a dose of from 1000 to 2000, preferably from 1100 to 1900, with particular preference from 1200 to 1600, with very particular preference from 1300 to 1700, and in particular from 1400 to 1600, mJ/cm$^2$. If desired, this curing may be supplemented by actinic radiation from other radiation sources. In the case of electron beams, it is preferred to operate under an inert gas atmosphere. This can be ensured, for example, by supplying carbon dioxide and/or nitrogen directly to the surface of the powder slurry coat. In the case of curing with UV radiation as well, it is possible to operate under inert gas in order to prevent the formation of ozone Curing with actinic radiation is carried out using the customary and known radiation sources and optical auxiliary measures. Examples of suitable radiation sources are flashlights from the company VISIT, high-pressure or low-pressure mercury vapor lamps, with or without lead doping in order to open a radiation window of up to 405 nm, or electron beam sources. The arrangement of these sources is known in principle and may be adapted to the circumstances of the workpiece and the process parameters. In the case of workpieces of complex shape, as provided for automobile bodies, those regions not accessible to direct radiation (shadow regions), such as cavities, folds and other structural undercuts, may be (partially) cured using point, small-area or all-round emitters, in combination with an automatic movement apparatus for the irradiation of cavities or edges.

The equipment and conditions for these curing methods are described, for example, in R. Holmes, U.V. and E.B. Curing Formulations for Printing Inks, Coatings and Paints, SITA Technology, Academic Press, London, United Kingdom 1984.

Full curing here may take place in stages, i.e., by multiple exposure to light or actinic radiation. It can also take place in alternation; in other words, by curing alternately with UV radiation and electron beams.

In the case of dual cure, thermal curing and curing with actinic radiation can be employed simultaneously or in succession. If the two curing methods are used in succession, it is possible, for example, to commence with thermal curing and end with curing with actinic radiation. In other cases, it may prove advantageous to commence and to end with curing with actinic radiation Of course, the curing methods described above can be employed, within the bounds of the process of the invention, for curing additional coats as well, especially clearcoats.

The combination effect coat for use in accordance with the invention may be coated with at least one additional coat. Preferably, the additional coat concerned comprises at least one clearcoat. This results in particularly advantageous coating systems of the invention having an outstanding overall visual appearance and a particularly high scratch resistance.

When the combination effect coat is coated with a clearcoat, the cured combination effect coat may be overcoated with at least one clearcoat, which is then cured on its own.

In a second variant, which is preferred in accordance with the invention, the uncured, or only partially cured, pigmented powder slurry coat may be overcoated directly with at least one clearcoat, after which the clearcoat film(s) is (are) cured together with the pigmented powder slurry coat and, if appropriate, the electrodeposition coat (wet-on-wet process)

Suitable clearcoats are all customary and known clearcoats.

Examples of suitable clearcoats are the following:

thermally curable one-component (1K), two-component (2K) or multicomponent (3K, 4K) clearcoats, as described in German Patent Application DE 42 04 518 A1, in European Patent Applications EP 0 594 068 A1, 0 594 071 A1, 0 594 142 A1, 0 604 992 A1 or 0 596 460 A1, in the International Patent Applications WO 94/10211, WO 94/10212, WO 94/10213, WO 94/22969 or WO 92/22615, or in U.S. Pat. Nos. 5,474,811 A1, 5,356,669 A1 or 5,605,965 A1;

thermally curable powder clearcoats, as disclosed, for example, in German Patent Application DE 42 22 194 A1 or in the product information bulletin from BASF Lacke+Farben AG, "Pulverlacke", 1990;

powder slurry clearcoats curable thermally and/or with actinic radiation, as are described, for example, in U.S. Pat. No. 4,268,542 A1 or U.S. Pat. No. 5,379,947 A1 and in patent applications DE 27 10 421 A1, DE 195 40 977 A1, DE 195 18 392 A1, DE 196 17 086 A1, DE 196 13 547 A1, DE 196 18 657 A1, DE 196 52 813 A1, DE 196 17 086 A1, DE 198 14 471 A1, DE 198 41 842 A1 or DE 198 41 408 A1, or in German Patent Applications DE 199 08 018.6 or DE 199 08 013.5, unpublished at the priority date of the present specification; or UV-curable clearcoats and powder clearcoats, as disclosed, for example, in European Patent Applications EP 0 928 800 A1, 0 636 669 A1, 0 410 242 A1, 0 783 534 A1, 0 650 978 A1, 0 650 979 A1, 0 650 985 A1, 0 540 884 A1, 0 568 967 A1, 0 054 505 A1 or 0 002 866 A1, in German Patent Applications DE 197 09 467 A1, 42 03 278 A1, 33 16 593 A1, 38 36 370 A1, 24 36 186 A1 or 20 03 579 B1, in International Patent Applications WO 97/46549 or 99/14254, or in U.S. Pat. Nos. 5,824,373 A1, 4,675,234 A1, 4,634,602 A1, 4,424,252 A1, 4,200,313 A1, 4,163, 810 A1, 4,129,488 A1, 4,064,161 A1 or 3,974,303 A1. Also known are powder coating materials which can be crosslinked thermally and with actinic radiation (cf. European Patent Application EP 0 844 286 A).

The resulting clearcoats may further be coated with a scratchproof coating of an organically modified ceramic material, as on the market under the brand name ORMOCER®, for example.

Overall, the process of the invention for producing the coating systems of the invention offers the extremely environmentally and economically advantageous and significant possibility of not only producing coating systems with a reduced number of coats but of doing so on a purely aqueous basis without emission of volatile organic substances. If the corresponding solvent-free clearcoats are employed, this also applies to the coating systems of the invention which comprise at least one clearcoat.

The coating systems of the invention obtained in the manner of the invention are distinguished by very good substrate adhesion, very good intercoat adhesion, outstanding corrosion protection, very good protection against stonechipping and other mechanical damage, very good leveling, and a very good overall visual appearance, especially as regards depth of color, metallic effect, dichroic effect, and D.O.I. (distinctness of the reflected image).

The bodies of the invention coated accordingly therefore have a very good aesthetic effect and a particularly long service life.

EXAMPLES

Examples 1 to 4

The production of Coating Systems of the Invention

For Examples 1 to 4, a powder coating material was first prepared, as described in German Patent Application DE 196 18 657 A1, from 77.4 parts by weight of a methacrylate copolymer formed from methyl methacrylate, glycidyl methacrylate, n-butyl acrylate and styrene, 19.4 parts by weight of 1,12-dodecanedicarboxylic acid, 2 parts by weight of a commercial UV absorber (Ciba® CGL 1545), 1 part by weight of the commercial light stabilizer Tinuvin® 123, and 0.25 part by weight of the commercial light stabilizer Irgafos® PEPQ.

This powder coating material was dispersed in water in accordance with the experimental procedure specified in German Patent Application DE 196 18 657 A1, column 6, to give a pigmented powder slurry.

Table 1 gives an overview of the nature and amount of the constituents used in this case.

TABLE 1

The preparation of pigmented powder slurries for use in accordance with the invention (Exaznples 1 to 4)

| Constituent | Parts by weight - Example: | | | |
| --- | --- | --- | --- | --- |
| | 1 | 2 | 3 | 4 |
| Predispersion: | | | | |
| DI water[4] | 42 | 42 | 42 | 42 |
| Disperse Aid W22[b] | 1.03 | 1.03 | 1.03 | 1.03 |
| Triton X100[c] | 0.02 | 0.02 | 0.02 | 0.02 |
| Dimethylethanolamine | 0.08 | 0.08 | 0.00 | 0.06 |
| RM 8[d] | 0.9 | 0.9 | 0.9 | 0.9 |
| Titan Rutil R 900-28[e] | 14.3 | 2.2 | 3.8 | — |
| Irgazine Blue A3 RN | — | 1.09 | — | — |
| Palomar Blue B-4170 | — | 0.65 | 1.72 | — |
| Palomar Blue B-4806 | — | — | — | 0.45 |
| Hostaperm Pink B | — | — | — | 1.1 |
| Heliogen Green L 8730 | — | — | 0.38 | — |
| Heliogen Blue L 6930 | — | — | — | 3.0 |
| Flammruβ 101[f] | — | — | 0.13 | — |
| Talc | 3.9 | 4.35 | 4.3 | — |
| Aluminum silicate | — | 7.64 | 9.77 | — |
| Powder coating material | 18.08 | 21.1 | 20.9 | 28.65 |

TABLE 1-continued

The preparation of pigmented powder slurries
for use in accordance with the invention
(Examples 1 to 4)

| | Parts by weight - Example: | | | |
|---|---|---|---|---|
| Constituent | 1 | 2 | 3 | 4 |
| Make-up: | | | | |
| DI water[a] | 18.04 | 18.01 | 18.04 | 17.49 |
| RM 8[d] | 0.7 | 0.7 | 0.7 | 0.7 |
| Byk 333[g] | 0.05 | 0.05 | 0.05 | 0.05 |
| Triton X100[c] | 0.18 | 0.18 | 0.18 | 0.18 |
| Merlin Extra Fine Blue 639[h] | — | — | — | 1.9 |
| Merlin Extra Fine Violet 5[h] | — | — | — | 0.95 |
| Alu-Stapa Hydrolux VP 51284[i] | — | — | — | 1.5 |

[a] deionized water;
[b] polurethane-based dispersant from Daniel Products;
[c] defoamer from Union Carbide;
[d] polyurethane-based thickener from Rohm & Haas;
[e] titanium dioxide pigment from Kronos Titan;
[f] carbon black pigment from Degussa;
[g] leveling agent from Byk Chemie;
[h] dichroic pigments from Mearl;
[i] aluminum pigment from Eckhart.

Steel panels (body panels) coated with a customary and known cathodically deposited and baked electrodeposition coating were coated manually with the pigmented powder slurries using a customary and known spray gun (pressures 5 bar; 2 spray passes, horizontal and vertical). The wet film thicknesses were chosen such that baking resulted in 40 μm coat thicknesses. The pigmented powder slurry coats were flashed off at 50° C. for 10 minutes and overcoated with a commercial conventional two-component clearcoat from BASF Coatings AG. The resulting clearcoat films were flashed off for 10 minutes, after which the pigmented powder slurry coats and the clearcoats were baked at 150° C. for 30 minutes. The thickness of the clearcoats was 50 μm.

The resultant coating systems of Examples 1 to 4 exhibited excellent hiding power. Their respective shade, metallic effect and dichroic or mica effect corresponded entirely to those of correspondingly pigmented basecoats. The adhesion to the primer, and the intercoat adhesion, and also the antistonechip effect, were very good even after weathering under constant humid climate conditions. Defects in leveling, popping, cracking (mud-cracking) or surface structures such as orange peel were not observed.

Consequently, the coating systems of the invention are fully able to replace the conventional coating systems comprising surfacer coat or antistonechip primer, basecoat, and clearcoat

What is claimed is:

1. A coating system, comprising a combination effect coat which simultaneously provides:
   (i) at least one function selected from the group consisting of color, effect or the combination thereof; as well as
   (ii) at least one function selected from the group consisting of corrosion protection, adhesion promotion, absorption of mechanical energy, or the combination of two or more of the foregoing; said combination effect coat resulting from the application and curing of a pigmented powder slurry having a residual volatile solvent content of less than 1% by weight, wherein the pigmented powder slurry is curable thermally, or thermally and with actinic radiation;
   wherein the pigmented powder slurry consists of finely divided dimensionally stable constituents having an average particle size of from 0.8 to 40 μm, and
   wherein the pigmented powder slurry comprises:
   a (meth)acrylate copolymer having an epoxide equivalent weight of 400 to 2500; and
   a color pigment, an effect pigment, or a combination thereof.

2. The coating system of claim 1, wherein the combination effect coat has a thickness of from 10 to 100 μm.

3. The coating system of claim 1, wherein the combination effect coat has the function of a surfacer coat or antistonechip primer and of a basecoat.

4. The coating system of claim 1, wherein the pigmented powder slurry comprises finely divided constituents having an average particle size of from 0.8 to 20 μm.

5. The coating system of claim 1, wherein the pigmented powder slurry is free from organic solvents.

6. The coating system of claim 1, wherein the pigmented powder slurry is pseudoplastic.

7. The coating system of claim 1, wherein the combination effect coat is overcoated with at least one clearcoat.

8. The coating system of claim 1, wherein the pigmented powder slurry is applied to a cathodically deposited electrodeposition coating to provide a pigmented powder slurry coat which is subsequently cured to provide the combination effect coat.

9. The coating system of claim 8, wherein the combination effect coat is overcoated with at least one clearcoat to provide a clearcoat film, after which the clearcoat film is cured.

10. A coated article comprising at least one layer from the coating system of claim 1.

11. The coating system of claim 1 wherein the combination effect coating further comprises a separate solid phase comprising pigment.

12. The coating system of claim 4, wherein the finely divided constituents of the pigmented powder slurry do not contain pigment and the combination effect coating further comprises a separate solid phase comprising the overall amount of pigment.

13. The coating system of claim 8, wherein the cathodically deposited electrodeposition coating is uncured when the pigmented powder slurry coating is applied.

14. The coating system of claim 8 wherein the cathodically deposited electrodeposition coating is partially cured when the pigmented powder slurry coating is applied.

15. The coating system of claim 8 wherein the cathodically deposited electrodeposition coating is fully cured when the pigmented powder slurry coating is applied.

16. The coating system of claim 8 wherein the pigmented powder slurry coat is cured with curing selected from the group consisting of physically, thermally, with actinic radiation, and mixtures thereof.

17. The coating system of claim 9, wherein the clearcoat film is cured thermally and/or with actinic radiation.

18. The coating system of claim 17 wherein the clearcoat film is cured simultaneously with the pigmented powder slurry coat.

19. The coating system of claim 18 wherein the clearcoat film is cured simultaneously with the pigmented powder slurry coat and the electrodeposition coat.

20. The coated article of claim 10 which is part of a motor vehicle body.

21. The coating system of claim 1 wherein the combination effect coat provides color and/or effect and also absorbs mechanical energy.

22. The coating system of claim 21 wherein the combination effect coat also provides corrosion protection or promotes adhesion.

23. The coating system of claim 22 wherein the combination effect coat provides color and/or effect and also absorbs mechanical energy, provides corrosion protection, and promotes adhesion.

24. A method of making the coating system of claim 1, comprising a combination effect coat, comprising applying a pigmented powder slurry to a substrate to make a coated substrate, the pigmented powder slurry consisting of finely divided dimensionally stable constituents having an average particle size of from 0.8 to 40 μm, and having a residual volatile solvent content of less than 1% by weight, consisting of finely divided dimensionally stable constituents having an average particle size of from 0.8 to 40 μm, and comprising a (meth)acrylate copolymer having an epoxide equivalent weight of 400 to 2500, and a color pigment, an effect pigment, or a combination thereof; and curing the coated substrate thermally, or thermally and with actinic radiation, to provide a combination effect coat that provides color and/or effect and also does at least one of the following: absorbs mechanical energy, provides corrosion protection, or promotes adhesion.

25. The coating system of claim 2, wherein the combination effect coat has a thickness of from 30 to 60 μm.

* * * * *